March 28, 1933. J. H. GREENE 1,902,850
DENTAL INSTRUMENT
Original Filed March 5, 1931
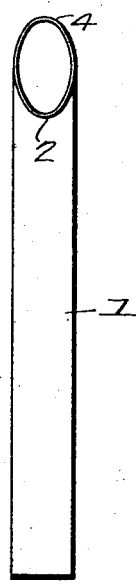
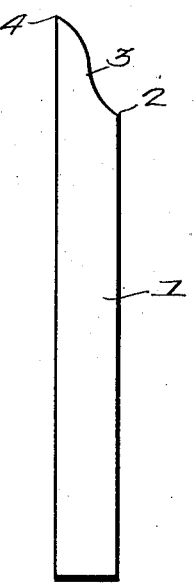
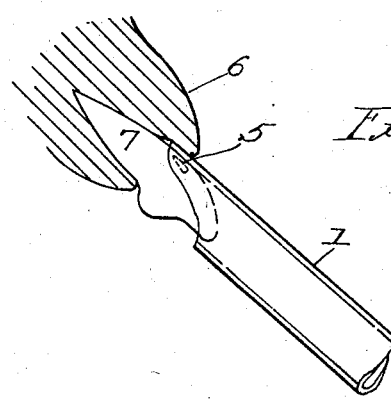
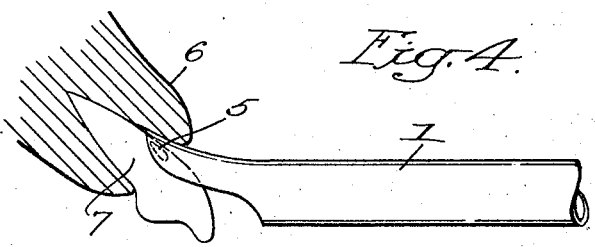
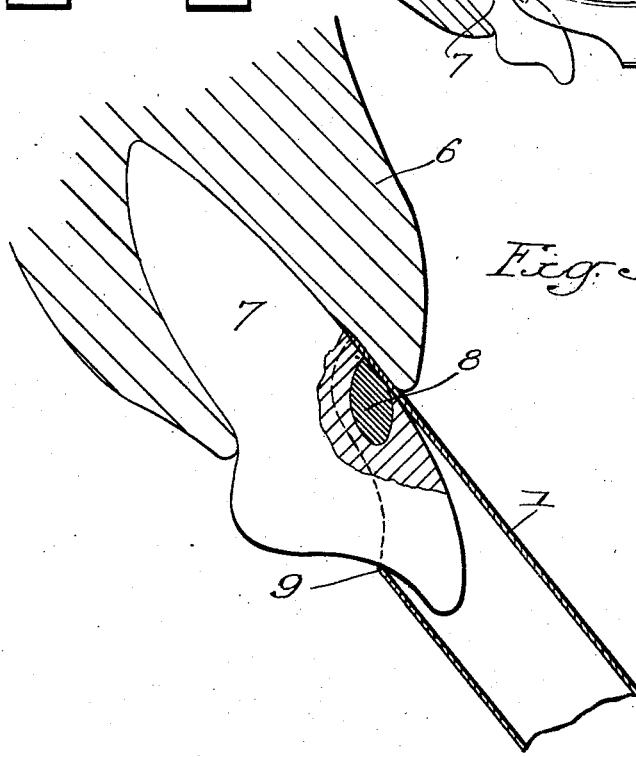
Inventor:
John H. Greene
by his Attorneys,
Howson & Howson Patented Mar. 28, 1933

1,902,850

UNITED STATES PATENT OFFICE

JOHN H. GREENE, OF PHILADELPHIA, PENNSYLVANIA

DENTAL INSTRUMENT

Application filed March 5, 1931, Serial No. 520,363. Renewed August 18, 1932.

This invention relates to new and useful improvements in dental instruments and more particularly to dental instruments for use in conjunction with the filling of cervical cavities.

One object of the invention is to provide a dental instrument composed of a non-metallic and relatively resilient substance.

Another object of the invention is to provide an instrument of the stated character which is capable of conforming to the contour of various and different teeth and irregularities in the festoon of the gum.

Another object of the invention is to provide an instrument of the type described which, when used in conjunction with porcelain or other non-metallic filling substances, will eliminate discoloration of the said fillings as a result of contact with metallic substances.

A further object of the invention is to provide an instrument of the character described which is simple in construction, efficient in operation and relatively cheap to manufacture.

The invention further resides in certain features and details of construction which are set forth hereinafter and shown in the accompanying drawing, in which:

Figure 1 is a front elevation of the instrument constituting the invention;

Fig. 2 is a side elevation of the instrument shown in Fig. 1;

Fig. 3 is a view showing the instrument constituting the invention when inserted intermediate the gum and a tooth;

Fig. 4 is a view showing the instrument positioned to raise the gum to permit insertion of filling into a cavity; and Fig. 5 is an enlarged view showing the instrument in position for pressing the filling and forming the external contour thereof to conform with the general contour of the tooth.

It is well known in the practice of dental surgery that the use of metal instruments, in conjunction with porcelain or cement fillings for cavities, creates a general tendency for the said filling to become discolored, and it will be noted that the instrument constituting my invention and herein set forth, wholly eliminates this undesirable and unsightly condition. Likewise, the greater number of dental instruments in use at the present time for working with cervical cavities, are, as previously set forth, composed of metallic substances, and require a special adjustment of the contacting surface of the instrument for work on each different tooth. The instrument herein set forth is composed of resilient material which enables it to automatically conform to the surface contour of the specific tooth on which work is in progress.

Also, in dental work of this type, namely that in connection with cervical cavities, it is desirable to have the instrument, when inserted intermediate the gum and a tooth, to remain in that position while the dentist is mixing the necessary cement for the filling. In the past this feature has been entirely impossible, as a result of the excessive weight of the metal instruments; and by providing a suitable non-metallic instrument of the type set forth herein, and which is substantially light in weight, the said instrument may be lodged in the above described operative position between the gum and tooth, without likelihood of becoming dislodged therefrom.

Referring now to the drawing, the instrument comprises a tubular body 1, having one side thereof substantially shorter than the diametrically opposed side as shown by reference numeral 2 in Fig. 2, and having that portion of the instrument intermediate the said sides cut away, as indicated at 3 and forming projecting end 4 constituting the relatively long side aforementioned. The instrument in the present instance is composed of a non-metallic resilient substance such as celluloid or other equally suitable material, and it is essential to the operative practicability of the instrument that it should be so constructed.

In using the instrument when filling a cervical cavity, designated as 5, access to which is obstructed by the gum 6, the projecting end 4 of the instrument is festooned to fit the gingival contour of the tooth 7 and is placed intermediate the said gum 6 and the tooth 7 substantially as shown in Fig. 3 of the drawing. The said instrument, due to the relatively light weight thereof will remain in the above position and the seepage of saliva into the cavity or surrounding surface, while the dentist is preparing the filling material for insertion, is prevented, as a result of the close contact of the projecting end 4 with the tooth and the simultaneous stretching of the gum tissue therearound. The gum 6 may be lifted to substantially clear the cavity 5 by movement of the tubular instrument 1 to a position similar to that shown in Fig. 4, the said instrument when raised, affording adequate space for the subsequent filling operation.

Furthermore, when the filling has been deposited in the cavity, the instrument is forced on the thicker portion of the tooth so that the periphery of the tubular body 1 adjacent the shorter side thereof, impinges the tooth as at 9, Fig. 5, and the tubular resilient form of the instrument forces the operative end of the instrument to conform to the surface contour of the tooth. The outer surface of the filling is thus made to conform to the general external contour of the entire tooth and maintains the filling free from contact with saliva until the said filling becomes set.

It will be obvious that to produce this effective and desirable feature, it is necessary that the instrument be made of resilient material and be tubular in shape, and while I have set forth the embodiment of my invention, it will be apparent that certain detail changes may be made thereto without departing from the spirit of the invention.

I claim:

1. A dental instrument of the type described comprising a tubular body, the said body having one side thereof substantially shorter than a diametrically opposed side and longitudinally and circumferentially resilient.

2. A dental instrument of the type described comprising a tubular body having one side thereof substantially shorter than a diametrically opposed side and longitudinally and circumferentially resilient, the longer of said sides being contoured to conform to the surface of a tooth and any irregularity in the festoon of the gum.

3. A dental instrument of the type described comprising a tubular body, said body having one side thereof substantially shorter than a diametrically opposed side and circumferentially resilient.

JOHN H. GREENE.